(12) United States Patent
Maguire et al.

(10) Patent No.: US 11,422,082 B2
(45) Date of Patent: Aug. 23, 2022

(54) METHOD FOR DEMONSTRATING CLEANSING EFFICACY

(71) Applicant: Conopco, Inc., Englewood Cliffs, NJ (US)

(72) Inventors: Stephen Paul Maguire, Liverpool (GB); Joseca Santos Alincastre, Shanghai (CN)

(73) Assignee: Conopco, Inc., Englewood Cliffs, NJ (US)

( * ) Notice: Subject to any disclaimer, the term of this patent is extended or adjusted under 35 U.S.C. 154(b) by 165 days.

(21) Appl. No.: 16/955,993

(22) PCT Filed: Dec. 10, 2018

(86) PCT No.: PCT/EP2018/084085
§ 371 (c)(1),
(2) Date: Jun. 19, 2020

(87) PCT Pub. No.: WO2019/134786
PCT Pub. Date: Jul. 11, 2019

(65) Prior Publication Data
US 2020/0408660 A1     Dec. 31, 2020

(30) Foreign Application Priority Data

Jan. 3, 2018 (WO) ............... PCT/CN2018/000006
Feb. 12, 2018 (EP) .................................... 18156285

(51) Int. Cl.
*G01N 15/00* (2006.01)
*G01N 15/08* (2006.01)

(52) U.S. Cl.
CPC . *G01N 15/0826* (2013.01); *G01N 2015/0846* (2013.01)

(58) Field of Classification Search
CPC .... G01N 15/00; G01N 15/08; G01N 15/0826; G01N 1/28–36; G01N 2015/0846
See application file for complete search history.

(56) References Cited

U.S. PATENT DOCUMENTS

2002/0193277 A1* 12/2002 Takeshima ............... C11D 3/48
510/458

FOREIGN PATENT DOCUMENTS

| EP | 1302241 | | 4/2003 | |
| JP | 2004277675 A | * | 10/2004 | ............... C11D 7/16 |
| WO | WO9411721 | | 5/1994 | |

OTHER PUBLICATIONS

Search Report and Written Opinion in EP18156285; dated Aug. 24, 2018.

(Continued)

*Primary Examiner* — Nguyen Q. Ha
(74) *Attorney, Agent, or Firm* — Foley & Lardner LLP

(57) ABSTRACT

A method is disclosed for demonstrating the cleansing efficacy of a personal care product or a component thereof, the method comprising: (i) selecting a first portion of a porous article capable of allowing a gas to pass through its pores, wherein the porous article is connected to a source of said gas and immersed in a liquid while the source releases said gas which flows out of said pores to generate gas bubbles; (ii) treating the first portion of the porous article with contaminants; (iii) treating the first portion of the porous article with the personal care product or the component thereof, wherein a second portion of the porous article is selected in step (i); the second portion is also treated with contaminants in step (ii); and the second portion is treated with a comparative or placebo product in step (iii); and wherein following step (iii) the method comprises a step (iv) of assessing a change of the treated first portion relative to (Continued)

untreated article and/or relative to the treated second portion, the change is the amount of gas bubbles released from the porous article.

20 Claims, 2 Drawing Sheets

(56) References Cited

OTHER PUBLICATIONS

Hauter; How to Clean and Rejuvenate Old Air Stones; The Spruce Pets.com; 2018; 1-2; XP055500437; https://www.thesprucepets.com/clean-and-rejuvenate-old-air-stones-2920956.
Search Report and Written Opinion in PCTEP2018084085 dated Mar. 19, 2019.

* cited by examiner

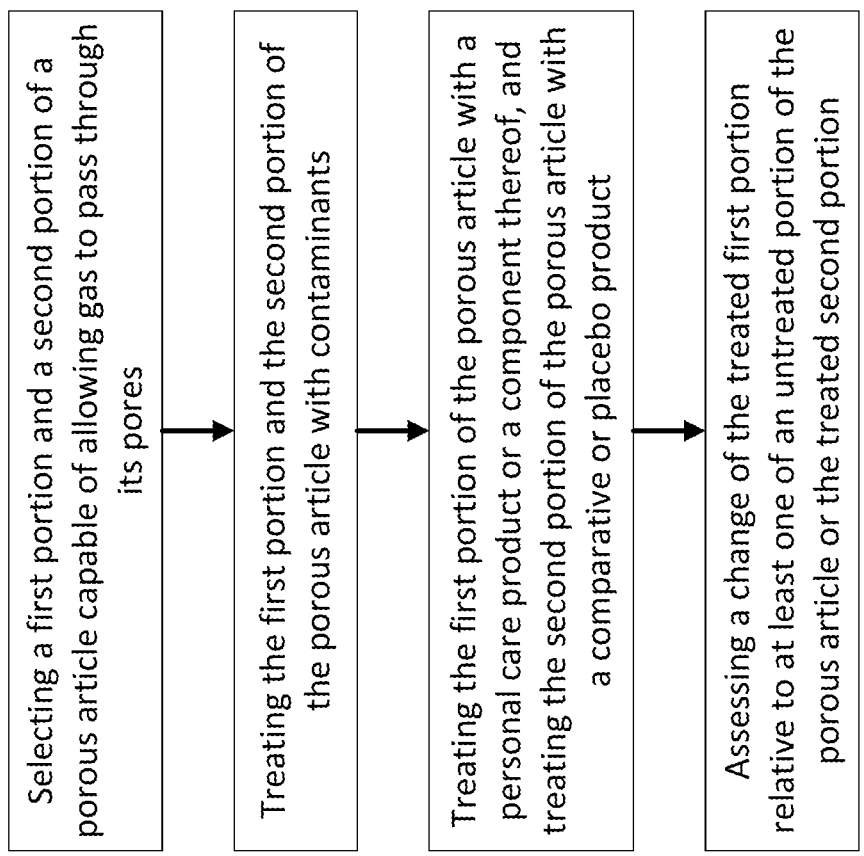

METHOD FOR DEMONSTRATING CLEANSING EFFICACY

CROSS-REFERENCE TO RELATED PATENT APPLICATIONS

This application is a U.S. National Stage Application under 35 U.S.C. § 371 of International Application No. PCT/EP2018/084085, filed on Dec. 10, 2018, which claims the benefit of European Patent Application No. 18156285.1, filed Feb. 12, 2018, and International Patent Application No. PCT/CN2018/000006, filed on Jan. 3, 2018, the entire disclosures of which are hereby incorporated by reference for any and all purposes.

TECHNICAL FIELD OF THE INVENTION

The present invention relates to a method for demonstrating the cleansing efficacy of a personal care product or a component thereof. In particular, the method comprises selecting of a first portion of a porous article capable of allowing a gas to pass through its pores, treating the first portion of the article with contaminants, then treating the first portion of the article with the personal care product or the component thereof and observing the gas bubbles released from the first portion of the article.

BACKGROUND OF THE INVENTION

Personal care products have been designed to improve the condition of skin or hair. For example, hair care compositions comprising one or more cleansing surfactants are known in the art to provide cleansing benefits to the hair and/or scalp. Unfortunately, however, the benefits of such products may not be immediately perceived by a user and in fact may take many hours or even days of repeat application to yield consumer-perceivable benefits.

In vivo and in vitro instrumental measurement of the cleanliness of skin (including scalp) or hair are often complicated and/or involve expensive laboratory equipment. Furthermore, such measurements often result in numerical parameters that are difficult for laymen to understand or at least relate to the expected product efficacy.

EP 1 302 241 A2 discloses a method for evaluating a fluid as a fabric-care composition or as component thereof, the method comprising providing a test sheet of fabric comprising a plurality of test regions, simultaneously contacting the test regions with a fluid.

WO 94/11721 discloses an ultrasonic detection apparatus for detecting defects in filters. The apparatus operates on a wetted filter and includes a housing. The wetted filter divides the housing into an inlet side and an outlet side. Both the inlet side and the outlet side may be filled with a gas as with a standard forward flow test apparatus. A microphone is disposed in the vicinity of the wetted filter. The microphone receives acoustic signals generated within the chamber (any combination of inlet side, outlet side, inlet tube, or outlet tube) as a result of the increased pressure on the inlet side. A signal processing device is also included for analysing the acoustic signals received by the microphone for determining whether a filter is defective. The invention includes multiple methods for determining whether a filter is defective. One method may include the steps of placing a wetted filter in a test housing to divide the test housing into an inlet side and an outlet side, pressurizing the inlet side with gas, measuring both the gas flow and the sound volume on the outlet side, and thereby determine whether the filter is defective.

Stan Hauter et al: "how to clean and rejuvenate old air stones a recommended method for rejuvenating aquarium airstones", XP055500437, discloses methods to clean and rejuvenate airstones to restore their effectiveness.

The present inventors have thus identified a need to provide methods which can demonstrate the cleansing efficacy of a personal care product but which does not need specialist equipment and/or is easily related to consumer benefits.

SUMMARY OF THE INVENTION

In a first aspect, the present invention is directed to a method for demonstrating the cleansing efficacy of a personal care product or a component thereof, the method comprising:
  (i) selecting a first portion of a porous article capable of allowing a gas to pass through its pores, wherein the porous article is connected to a source of said gas and immersed in a liquid while the source releases said gas which flows out of said pores to generate gas bubbles;
  (ii) treating the first portion of the porous article with contaminants;
  (iii) treating the first portion of the porous article with the personal care product or the component thereof;
wherein a second portion of the porous article is selected in step (i); the second portion is also treated with contaminants in step (ii); and the second portion is treated with a comparative or placebo product in step (iii); and
wherein following step (iii) the method comprises a step (iv) of assessing a change of the treated first portion relative to untreated article and/or relative to the treated second portion, the change is the amount of gas bubbles released from the porous article.

All other aspects of the present invention will more readily become apparent upon considering the detailed description and examples which follow.

BRIEF DESCRIPTION OF THE FIGURES

FIG. 2 is a flow diagram of the method shown in FIG. 1.

DETAILED DESCRIPTION

Figure 1:
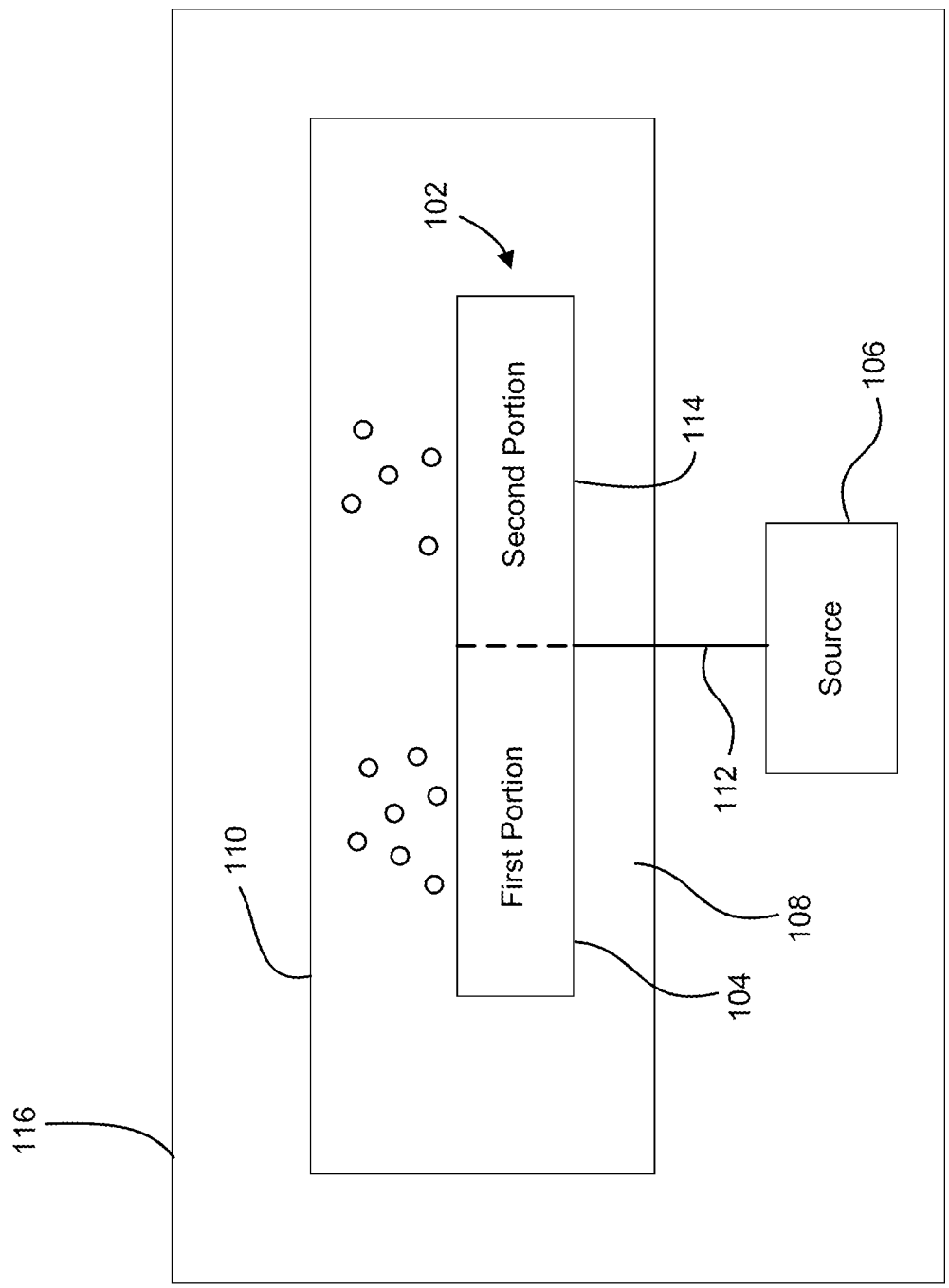
FIG. 1 is a block diagram of a method of demonstrating and/or displaying cleansing efficacy of a personal care product or a component thereof, according to an illustrative embodiment.

Except in the examples, or where otherwise explicitly indicated, all numbers in this description indicating amounts of material or conditions of reaction, physical properties of materials and/or use may optionally be understood as modified by the word "about".

All amounts are by weight of the final oral care composition, unless otherwise specified.

It should be noted that in specifying any ranges of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

The method of the present invention comprises step (i) of selecting a first portion (104) of a porous article (102) capable of allowing a gas to pass through its pores, wherein the porous article (102) is connected to a source (106) of said gas and immersed in a liquid (108) while the source (106) releases said gas which flows out of said pores to generate gas bubbles. Porous article (102), as used herein, means any article having pores on surfaces and/or voids in body capable of allowing a gas to pass through. Preferably, the porous article (102) is solid. Solid, as used herein, refers to the state at ambient environment (25° C. and atmospheric pressure).

The porous article (102) is capable of allowing a gas to pass through its pores. Gas, as used herein, refers to the state at ambient environment (25° C. and atmospheric pressure). The gas may be a pure gas or a gas mixture containing a variety of pure gases like the air. Preferably, the gas is air.

Typically, the porous article (102) is a diffuser for bubbles, more preferably a bubbler, most preferably an air stone. The porous article (102) is usually made of hard woods with fine, straight, porous grain including basswood, silver birch, oak or limewood, ceramics, minerals, plastic, natural porous stone like pumice, or glass beads bonded into small cylinders that are designed to release bubbles of various sizes.

The porous article (102) is immersed in a liquid (108), preferably the liquid (108) is held in a container (110) such as an aquarium or a specialized structure like a beaker. Preferably, the liquid (108) is aqueous including water or water solutions, preferably water. Deionized water is preferably used. Water containing mineral cations can also be used. The liquid (108) preferably comprises water greater than 1.5%, more preferably greater than 5%, more preferably still greater than 10% and most preferably from 20 to 100% by weight of the liquid.

The porous article (102) is connected to a source (106) of gas by a length of tubing (112) which releases the gas through the tubing and flows out the pores of the porous article (102) to generate gas bubbles. Preferably, the source (106) of gas is an air pump.

The porous article (102) according to the invention can be of different sizes and shapes. The article may be of cylinder, spherical, disc, platelet, cube or irregular shape form. The first portion (104) of the porous article (102) should not be too small. In particular, the first portion (104) should be visible to the naked eye. The diameter of the first portion (104) of the porous article (102) is preferably from 0.5 mm to 1 m, more preferably from 1 mm to 60 cm, more preferably still from 5 mm to 30 cm, and most preferably from 1 cm to 10 cm, including all ranges subsumed therein. Diameter, as used herein, means the largest measurable distance or a leading dimension on the first portion (104) of the porous article (102).

To produce fine air bubbles, the porous article (102) preferably has a pore size of from 10 nm to 2 mm, more preferably from 100 nm to 500 microns, more preferably still from 500 nm to 200 microns, and most preferably from 1 micron to 100 microns, including all ranges subsumed therein. The pore size refers to the largest measurable distance of the pore in the event a well-defined sphere is not generated. Pore size can be measured, for example, by scanning electron microscopy (SEM).

The method of the present invention comprises step (ii) of treating the first portion (104) of the porous article (102) with contaminants.

Contaminants, as used herein, refer to dirt, grease or a component thereof. In particular, those capable of depositing on hair or skin, and/or clogging the skin pores. Illustrative yet non-limiting examples of the types of the contaminants that may be used in the invention include, for example:

Wax, which is a high melting point oil with a melting point above 45° C., preferably above 55° C. Preferred waxes include fatty alcohols and fatty acid that are solid at room temperature, particularly preferred are paraffin wax, triglyceride or mixtures thereof. Most preferred are microcrystalline wax and bees wax;

Clay, as used herein, includes combinations of one or more clay minerals with traces of metal oxides and organic matter, for example, primary kaolin, bentonite, China clay, laponite, hectorite. Clay may be hydrophobically modified, such as stearalkonium hectorite, quaternium-18 bentonite, quaternium-18 hectorite, disteardimonium hectorite, derivatives or mixtures thereof;

Natural oil, preferably comprises a triglyceride of an unsaturated carboxylic acid containing 1,2, or 3 olefinic bonds. Preferably the unsaturated carboxylic acid containing 1, 2, or 3 olefinic bonds that is part of the triglyceride contains from 14 to 22 carbon atoms. More preferably the triglyceride is a triglyceride of an unsaturated carboxylic acid containing 16-20 carbon atoms. Most preferably, the triglyceride is a triglyceride of an unsaturated carboxylic acid containing 18 carbon atoms. Preferably, the natural oil comprises sunflower seed oil; or Other ingredients may be included to be deposited on hair or skin, and/or trapped in skin pores.

Preferably, the contaminant is in a form of styling products such as hair styling wax.

The treatment step (ii) comprises at least contacting the first portion (104) with the contaminant. The contact may, for example, comprise spreading the contaminant on at least one surface of the first portion (104). Preferably, the treatment step (ii) comprises the steps of: a) taking the first portion (104) out of the liquid (108); (b) treating the first portion (104) with the contaminant; (c) placing the first portion (104) back into the liquid (108).

The duration of the treatment step (ii), meaning the time between starting to apply the contaminant to the article and commencement of step (iii), is preferably between 1 s and 24 hours. However, the method may be especially suitable for situations where rapid demonstration of product efficacy is desired, such as for example, in-store and/or at point of sale. Thus it is preferred that the duration of the treatment step is from 1 s to 2 hours, more preferably from 5 s to 1 hour, more preferably still from 10 s to 10 minutes, and most preferably from 30 s to 5 minutes.

The method of the present invention comprises step (iii) of treating the first portion (104) of the porous article (102) with the personal care product or the component thereof.

The personal care product is preferably one intended for application to the hair and/or skin for the purpose of improving the condition thereof. In particular, the product is preferably intended to improve a condition of hair and/or skin selected from cleansing, barrier function, moisture retention, anti-dandruff and combinations thereof. Preferably the product is a hair care product, especially a hair care product intended to improve the condition of the scalp. The product is primarily intended for topical application to scalp and/or at least a portion of the hair of an individual, either in rinse-off or leave-on compositions, preferably in rinse-off compositions like shampoos.

The treatment step (iii) comprises at least contacting the first portion (104) with the product or component. The contact may, for example, comprise spreading the product or component on at least one surface of the first portion (104).

Additionally or alternatively the contact may comprise soaking the first portion (104) in a liquid comprising the product or component. The treatment may also comprise rinsing the first portion (104) following contact with the product or component.

Preferably, the treatment step (iii) comprises the steps of: (d) taking the first portion (104) out of the liquid (108); (e) treating the first portion (104) with the personal care product or a component thereof; (f) placing the first portion (104) back into the liquid (108).

In another embodiment the first portion (104) is treated with a component of the personal care product in step (iii). Treating the portion with the component rather than the entire product allows, for example, the component to be applied to the portion in a higher concentration than in the product and/or to be applied in a different manner than would be achieved by applying the whole product. Thus the cleansing efficacy of the component can be enhanced such that the same may be demonstrated in a short time. Preferably the first portion of the article is treated with an aqueous liquid comprising the component. More preferably the concentration of the component by weight of the aqueous liquid is greater than the concentration of the component by weight of the personal care product. For example the concentration of the component by weight of the aqueous liquid may be at least twice, more preferably at least three times, more preferably still at least five times and most preferably at least ten times the concentration of the component by weight of the personal care product.

The component should be associated with the product in some manner. By "associated" is meant that the method preferably comprises a step of identifying the component as an ingredient of the product. For example, prior to step (i) the method may comprise a step of selecting a component of the personal care product for assessment. Additionally or alternatively, the method may comprise a step of communicating the component as an ingredient of the personal care product through indicia such as text, video, audio and the like.

The component should be selected to be a component which may provide cleansing, barrier function, moisture retention, anti-dandruff and combinations thereof. For example the component preferably is or at least comprises surfactants, polyhydric alcohol, fatty materials (such as oils, fatty alcohols, fatty acids and/or soaps), silicone oil, anti-dandruff agents or a mixture thereof. Most preferably, the component comprises surfactants.

Preferred surfactants comprise or are cleansing surfactants. Preferably, the cleansing surfactants are anionic surfactants. Examples of suitable anionic cleansing surfactants are alkyl sulphates, alkyl ether sulphates, alkaryl sulphonates, alkanoyl isethionates, alkyl succinates, alkyl sulphosuccinates, alkyl ether sulphosuccinates, N-alkyl sarcosinates, alkyl phosphates, alkyl ether phosphates, and alkyl ether carboxylic acids and salts thereof, especially their sodium, magnesium, ammonium and mono-, di- and triethanolamine salts. The alkyl and acyl groups generally contain from 8 to 18, preferably from 10 to 16 carbon atoms and may be unsaturated. The alkyl ether sulphates, alkyl ether sulphosuccinates, alkyl ether phosphates and alkyl ether carboxylic acids and salts thereof may contain from 1 to 20 ethylene oxide or propylene oxide units per molecule.

Typical anionic cleansing surfactants for use in the invention include sodium oleyl succinate, ammonium lauryl sulphosuccinate, sodium lauryl sulphate, sodium lauryl ether sulphate, sodium lauryl ether sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauryl isethionate, lauryl ether carboxylic acid and sodium N-lauryl sarcosinate. Preferred anionic surfactants are the alkyl sulfates and alkyl ether sulfates. These materials have the respective formulae $R_2OSO_3M$ and $R_1O(C_2H_4O)_xSO_3M$, wherein $R_2$ is alkyl or alkenyl of from 8 to 18 carbon atoms, x is an integer having a value of from about 1 to about 10, and M is a cation such as ammonium, alkanolamines, such as triethanolamine, monovalent metals, such as sodium and potassium, and polyvalent metal cations, such as magnesium, and calcium. Most preferably $R_2$ has 12 to 14 carbon atoms, in a linear rather than branched chain. Preferred anionic cleansing surfactants are selected from sodium lauryl sulphate and sodium lauryl ether sulphate(n)EO, (where n is from 1 to 3); more preferably sodium lauryl ether sulphate(n)EO, (where n is from 1 to 3).

The component may also comprise co-surfactants such as amphoteric and zwitterionic surfactants. Illustrative yet non-limiting examples include alkyl amine oxides, alkyl betaines, alkyl amidopropyl betaines, alkyl sulphobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, wherein the alkyl and acyl groups have from 8 to 19 carbon atoms. Typical amphoteric and zwitterionic surfactants for use in the invention include lauryl amine oxide, cocodimethyl sulphopropyl betaine, lauryl betaine, cocamidopropyl betaine, cocamide MEA and sodium cocoamphoacetate. Preferably, the co-surfactant is cocamidopropyl betaine.

In an especially preferred embodiment, the component comprises sodium lauryl ether sulphate, cocamidopropyl betaine or a combination thereof, preferably a combination of sodium lauryl ether sulphate and cocamidopropyl betaine.

Preferred polyhydric alcohols include polyalkylene glycols and more preferably alkylene polyols and their derivatives, including propylene glycol, dipropylene glycol, polypropylene glycol, polyethylene glycol and derivatives thereof, sorbitol, hydroxypropyl sorbitol, hexylene glycol, 1,3-butylene glycol, isoprene glycol, 1,2,6-hexanetriol, glycerol, ethoxylated glycerol, propoxylated glycerol and mixtures thereof. Most preferred is glycerol (also known as glycerin).

Silicone oils may be divided into the volatile and nonvolatile variety. The term "volatile" as used herein refers to those materials which have a measurable vapor pressure at ambient temperature (25° C.). Volatile silicone oils are preferably chosen from cyclic (cyclomethicone) or linear polydimethylsiloxanes containing from 3 to 9, preferably from 4 to 5, silicon atoms.

Nonvolatile silicone oils useful as an emollient material include polyalkyl siloxanes, polyalkylaryl siloxanes and polyether siloxane copolymers. The essentially nonvolatile polyalkyl siloxanes useful herein include, for example, polydimethyl siloxanes with viscosities of from about $5 \times 10^{-6}$ to 0.1 $m^2/s$ at 25° C. Among the preferred nonvolatile emollients useful in the present compositions are the polydimethyl siloxanes having viscosities from about $1 \times 10^{-5}$ to about $4 \times 10^{-4}$ $m^2/s$ at 25° C.

Organopolysiloxane crosspolymers can be usefully employed. Representative of these materials are dimethicone/vinyl dimethicone crosspolymers and dimethicone crosspolymers available from a variety of suppliers including Dow Corning (9040, 9041, 9045, 9506 and 9509), General Electric (SFE 839), Shin Etsu (KSG-15, 16 and 18 [dimethicone/phenyl vinyl dimethicone crosspolymer]), and Grant Industries (Gransil brand of materials), and lauryl dimethicone/vinyl dimethicone crosspolymers supplied by Shin Etsu (e.g. KSG-31, KSG-32, KSG-41, KSG-42, KSG-43 and KSG-44).

Specific examples of fatty materials include stearyl alcohol, glyceryl monoricinoleate, mink oil, cetyl alcohol, isopropyl isostearate, stearic acid, isobutyl palmitate, isocetyl stearate, oleyl alcohol, isopropyl laurate, hexyl laurate, decyl oleate, octadecan-2-ol, isocetyl alcohol, eicosanyl alcohol, behenyl alcohol, cetyl palmitate, di-n-butyl sebacate, isopropyl myristate, isopropyl palmitate, isopropyl stearate, butyl stearate, polyethylene glycol, triethylene glycol, lanolin, cocoa butter, corn oil, cotton seed oil, olive oil, palm kernel oil, rape seed oil, safflower seed oil, evening primrose oil, soybean oil, sunflower seed oil, avocado oil, sesame seed oil, coconut oil, *arachis* oil, castor oil, acetylated lanolin alcohols, petroleum jelly, mineral oil, butyl myristate, isostearic acid, palmitic acid, isopropyl linoleate, lauryl lactate, myristyl lactate, decyl oleate, myristyl myristate, and mixtures thereof.

Suitable anti-dandruff agents include compounds selected from azole based anti-fungal agents, piroctone olamine, metal pyrithione salts, selenium sulfide or mixtures thereof, preferably azole based anti-fungal agents, metal pyrithione salts, piroctone olamine or mixtures thereof. The preferred azole based anti-fungal agents are ketoconazole and climbazole. Preferred metal pyrithione salts are zinc, copper, silver and zirconium pyrithione. Most preferably, the antidandruff agent comprises zinc pyrithione, climbazole, piroctone olamine or mixtures thereof.

The duration of the treatment step (iii) is preferably between 1 s to 24 hours. However, the method may be especially suitable for situations where rapid demonstration of product efficacy is desired, such as for example, in-store and/or at point of sale. Thus it is preferred that the duration of the treatment step is from 1 s to 2 hours, more preferably from 5 s to 1 hour, more preferably still from 10 s to 10 minutes, and most preferably from 30 s to 5 minutes.

Following step (iii) the method comprises a step (iv) of assessing at least one attribute of the tested first portion. Most preferably the attribute is assessed via observing by the naked eye directly. Additionally or alternatively, the attribute is assessed by taking images and/or videos with magnification of no greater than 100 times, preferably less than 10 times.

The method of the present invention is particularly effective when used to evaluate the cleansing efficacy of the personal care product or the component relative to a comparative or placebo product. Thus the method comprises selecting a second portion (114) of the article in step (i); treating the second portion (114) with contaminants in step (ii); treating the second portion (114) with the comparative or placebo product in step (iii).

The second portion (114) should be substantially identical to the first portion (104), for example in respect of the type of the article as well as length and pore size.

Comparative or placebo product as used herein means product which has no or lower levels of component than that of the personal care product or component to be tested. The comparative product may be any composition different from the personal care product or component to be tested. However, it is preferred that the concentration of the component by weight of the comparative or placebo product is no greater than half (½), more preferably one quarter (¼), and most preferably one tenth (1/10) of the concentration of the component by weight of the personal care product or component to be tested.

The assessed attribute in step (iv) is a change of the treated first portion relative to untreated article and/or relative to the treated second portion. The change is the amount of gas bubbles released from the porous article (102). The amount of gas bubbles released from the porous article (102) serves as an indicator providing a visual cue of the cleanliness of the article pores.

In one embodiment the method comprises a step of capturing images and/or shooting videos of demonstration, and storing and/or transmitting the images and/or videos. The images and/or videos may, for example, be stored on a recordable medium such as CD, flash drive or other computer-readable memory. The images and/or videos may be transmitted, for example, for display on one or more visible display units (116). Suitable visible display units (116) include, for example, monitors, TV screens and/or mobile device screens.

Additionally or alternatively, the method further comprises a step of capturing images and/or shooting videos of the demonstration and storing the same on a recordable medium.

Additionally or alternatively, the present invention is directed to a method for displaying images and/or videos on visible display units (116) for demonstrating the cleansing efficacy of a personal care product or a component thereof, wherein the images and/or videos show the following process:

(i) selecting a first portion (104) of a porous article (102) capable of allowing a gas to pass through its pores, wherein the porous article (102) is connected to a source (106) of said gas and immersed in a liquid (108) while the source (106) releases said gas which flows out of said pores to generate gas bubbles;

(ii) treating the first portion (104) of the porous article (102) with contaminants;

(iii) treating the first portion (104) of the porous article (102) with the personal care product or the component thereof;

wherein a second portion (114) of the porous article (102) is selected in step (i); the second portion (114) is also treated with contaminants in step (ii); and the second portion (114) is treated with a comparative or placebo product in step (iii); and wherein following step (iii) the method comprises a step (iv) of assessing a change of the treated first portion relative to untreated article and/or relative to the treated second portion, the change is the amount of gas bubbles released from the porous article (102).

The following examples are provided to facilitate an understanding of the invention. The examples are not intended to limit the scope of the claims.

EXAMPLES

Example 1

This example demonstrated the cleansing efficacy of shampoo compositions. Compositions were prepared according to the formulation detailed in Table 1. All ingredients are expressed by weight percent of the total formulation, and as level of active ingredient.

TABLE 1

| Ingredient | Percent by weight |
| --- | --- |
| Sodium Laureth Sulfate | 10%~25% |
| Cocamidopropyl betaine | 0.1%~10% |

TABLE 1-continued

| Ingredient | Percent by weight |
|---|---|
| Carbomer | 0.1~1% |
| Polymer | 0.1~1% |
| Zinc Pyrithione | 0.1~2% |
| Climbazole | 0.1~0.5% |
| Silicone | 0~10% |
| Water | Balance |

Methods

The comparative product was Head & Shoulders® shampoo claimed to have good cleansing efficacy, which comprises silicones, zinc pyrithione, zinc carbonate, sodium laureth sulfate and cocamide MEA.

Two identical air stones were connected to an air pump by a length of tubing which pumped air through the tubing and out the air stones, creating the bubbling action in water. The air stones were then treated with 1.5 g hair styling wax each, spread evenly and left for 30 minutes.

The air stones were placed in separate small bottles each containing a solution with the respective shampoo to water weight ratio of 1:15, shaken for one minute and then rinsed under running water for another minute. The air stones were then placed in a beaker filled with water to observe the generation of air bubbles.

Results

It was observed that the air stone treated with the test shampoo of Table 1 still released plenty of air bubbles in water, showing that the air stone was deeply purified and clean. In contrast, the air stone treated with the comparative product (Head and Shoulders® shampoo) released little air bubbles, which indicated the air stone was still covered with hair styling wax and the pores were extensively clogged.

The invention claimed is:

1. A method for demonstrating the cleansing efficacy of a personal care product or a component thereof, the method comprising:
   (i) selecting a first portion of a porous article capable of allowing a gas to pass through its pores, wherein the porous article is connected to a source of said gas and immersed in a liquid while the source releases said gas which flows out of said pores to generate gas bubbles;
   (ii) treating the first portion of the porous article with contaminants;
   (iii) treating the first portion of the porous article with the personal care product or the component thereof;
   wherein a second portion of the porous article is selected in step (i); the second portion is also treated with contaminants in step (ii); and the second portion is treated with a comparative or placebo product in step (iii); and
   wherein following step (iii) the method comprises a step (iv) of assessing a change of the treated first portion relative to at least one of an untreated portion of the porous article or the treated second portion, the change is an amount of gas bubbles released from the porous article.

2. The method of claim 1, wherein the porous article is an air stone.

3. The method of claim 1, wherein in step (i) the gas is air.

4. The method of claim 1, wherein in step (i) the liquid is aqueous.

5. The method of claim 4, wherein the liquid is water.

6. The method of claim 1, wherein the contaminants comprise dirt, grease or a component thereof.

7. The method of claim 6, wherein the contaminants comprise one of wax, clay, natural oils, or a mixture thereof.

8. The method of claim 1, wherein in step (iii) the first portion of the porous article is treated with an aqueous liquid comprising the component of the personal care product.

9. The method of claim 1, wherein in step (iii) the first portion of the porous article is treated with the component, and wherein the component of the personal care product comprises surfactants, polyhydric alcohol, fatty material, silicone oil, anti-dandruff agents or a mixture thereof.

10. The method of claim 9, wherein the component of the personal care product comprises surfactants.

11. The method of claim 9, wherein the surfactants comprise sodium lauryl ether sulphate, cocamidopropyl betaine or a combination thereof.

12. The method of claim 11, wherein the surfactants comprise a combination of sodium lauryl ether sulphate and cocamidopropyl betaine.

13. The method of claim 1, wherein the duration of the treating step (iii) is between 1 second to 2 hours.

14. The method of claim 13, wherein the duration of the treating step (iii) is between 5 second to 1 hour.

15. The method of claim 1, wherein the method further comprises at least one of capturing images or shooting videos of demonstration and at least one of storing or transmitting the images or videos, at least one of the images or videos may be transmitted for display on one or more visible display units.

16. The method of claim 1, wherein the personal care product is a hair care product.

17. The method according to claim 16, wherein the personal care product is a shampoo.

18. The method of claim 1, wherein the method further comprises at least one of capturing images or shooting videos of the demonstration and storing the same on a recordable medium.

19. A method for displaying at least one of images or videos on visible display units for demonstrating cleansing efficacy of a personal care product or a component thereof, wherein the at least one of images or videos show the following process:
   (i) selecting a first portion of a porous article capable of allowing a gas to pass through its pores, wherein the porous article is connected to a source of said gas and immersed in a liquid while the source releases said gas which flows out of said pores to generate gas bubbles;
   (ii) treating the first portion of the porous article with contaminants;
   (iii) treating the first portion of the porous article with the personal care product or the component thereof;
   wherein a second portion of the porous article is selected in step (i); the second portion is also treated with contaminants in step (ii); and the second portion is treated with a comparative or placebo product in step (iii); and
   wherein following step (iii) the method comprises a step (iv) of assessing a change of the treated first portion relative to at least one of an untreated portion of the porous article or the treated second portion, the change is an amount of gas bubbles released from the porous article.

20. The method of claim 19, wherein the porous article is an air stone.

* * * * *